(12) United States Patent  
Suenaga

(10) Patent No.: US 8,643,848 B2
(45) Date of Patent: Feb. 4, 2014

(54) METHOD AND APPARATUS FOR MEASURING SHAPE

(75) Inventor: Kentaro Suenaga, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 316 days.

(21) Appl. No.: 13/235,741

(22) Filed: Sep. 19, 2011

(65) Prior Publication Data

US 2012/0069349 A1    Mar. 22, 2012

(30) Foreign Application Priority Data

Sep. 21, 2010   (JP) ................................ 2010-210902

(51) Int. Cl.
*G01B 11/02* (2006.01)

(52) U.S. Cl.
USPC ........................................................ 356/511

(58) Field of Classification Search
USPC ........... 356/511, 239.1, 239.2, 489, 495, 512, 356/513, 515
See application file for complete search history.

(56) References Cited

U.S. PATENT DOCUMENTS

| 5,004,346 | A * | 4/1991 | KuMichael | 356/513 |
| 6,894,788 | B2 * | 5/2005 | Deck | 356/513 |
| 7,286,240 | B2 * | 10/2007 | Hill | 356/498 |
| 7,468,799 | B2 * | 12/2008 | de Groot et al. | 356/504 |
| 7,538,887 | B1 * | 5/2009 | Tang | 356/497 |
| 8,274,661 | B2 * | 9/2012 | Hasegawa | 356/511 |
| 2009/0303493 | A1 * | 12/2009 | Colonna de Lega et al. | 356/511 |

FOREIGN PATENT DOCUMENTS

JP    2008-532010 A    8/2008

* cited by examiner

*Primary Examiner* — Gregory J Toatley
*Assistant Examiner* — Shawn Decenzo
(74) *Attorney, Agent, or Firm* — Canon USA, Inc. IP Division

(57) ABSTRACT

A surface to be inspected is step-scanned in multiple steps. In each step, the phase corresponding to a shape measurement region in an interference fringe pattern, and the wavelength of light are measured. After defining a distance between any point on the surface to be inspected and the center of curvature of a reference spherical surface as a function of wavenumber (integer) including the measured phase and wavelength as parameters, the wavenumber in each step is calculated from the relationship of the function between adjacent steps, and the moving distance between each step is calculated. A measurement value of the distance is calculated from the wavenumber and the function thereof, a design value of the distance is calculated using the calculated moving distance, and the shape error of the surface to be inspected is calculated from the difference between the measurement value and the design value.

5 Claims, 11 Drawing Sheets

METHOD AND APPARATUS FOR MEASURING SHAPE

BACKGROUND OF THE INVENTION

1. Field of the Invention

The present invention relates to a method and apparatus for measuring the shape of an optical surface of an aspherical optical element or the like.

2. Description of the Related Art

In recent years, along with the superior quality and accuracy of semiconductor circuit patterns, the accuracy required for optical components used in semiconductor exposure apparatuses has been increased. For example, in an EUV exposure apparatus that uses an extreme ultraviolet (EUV) light source, the components of the projection optical system are essentially all aspherical optical elements, and an extremely high shape accuracy of 0.1 nm RMS or less is required for proper optical projection.

In order to manufacture high-accuracy aspherical optical elements such as mirrors for EUV exposure apparatuses, a shape measuring device having a measurement accuracy higher than the required shape accuracy is necessary. Given such extremely high levels of accuracy, it is difficult to provide a shape measuring device of this type. Nevertheless, such a shape measuring device has been proposed in PCT Japanese Patent Publication No. 2008-532010. The measuring device proposed in PCT Japanese Patent Publication No. 2008-532010 is a measuring device to which an interference measurement technique is applied. The measuring device measures the shape of the entire surface of an aspherical surface to be inspected using a scanning interferometer that scans an aspherical surface to be inspected along the interferometer optical axis. The configuration of the interferometer is as shown in FIG. 10. A brief review of PCT Japanese Patent Publication No. 2008-532010 is described below.

In FIG. 10, light emitted from a coherent light source 101 passes through a lens 102, an aperture 103, a beam splitter 104, and a collimator lens 105. In this manner, light is converted into a plane wave, and enters a Fizeau lens 167. Part of the light entering the Fizeau lens 167 is reflected on a reference surface 204 and forms reference light. On the other hand, light passing through the reference surface 204 is converted into a spherical wave, is reflected on an aspherical test surface 109, and forms light to be inspected. Because a spherical wave is incident on an aspherical surface, only light substantially perpendicularly incident on the test surface 109 re-enters the reference surface 204. When the test surface 109 is an axisymmetric aspherical surface, light reflected from the vicinity of the vertex of the test surface 109 and light reflected from an annular belt-like measurement region distant from the vertex re-enter the reference surface 204 as light to be inspected.

The reference light reflected on the reference surface 204 and the light to be inspected reflected on the test surface 109 and re-entering the reference surface 204 both pass through the collimator 105 and the beam splitter 4 and reach a beam splitter 212. The reference light and the light to be inspected passing through the beam splitter 212 pass through an aperture 170 and a lens 168, reach a first CCD camera 171, and form a first interference fringe pattern. By analyzing the interference fringe pattern observed on the first CCD camera 171, the phase of the annular belt-like interference fringe can be measured.

On the other hand, the reference light and the light to be inspected reflected on the beam splitter 212 pass through an aperture 210 and a lens 208, reach a second CCD camera 206, and form a second interference fringe pattern. The magnification differs between the first CCD camera 171 side and the second CCD camera 206 side. This interferometer is designed such that on the second CCD camera 206, the interference fringe corresponding to the light reflected from the vicinity of the vertex of the test surface 109 is magnified. For this reason, by analyzing the interference fringe pattern observed on the second CCD camera 206 (the second interference fringe pattern), the phase of the vicinity of the vertex of the test surface 109 can be measured.

FIG. 11 depicts an interference fringe pattern produced by interference between the reference light and the light to be inspected reflected on the test surface 109 in the above-described scanning interferometer. The region in the center of the interference fringe pattern having low fringe density compared to its surroundings corresponds to light reflected from the vicinity of the vertex of the test surface 109. The annular belt-like interference fringe is also a region having low fringe density compared to its surroundings and corresponds to light substantially perpendicularly incident on the test surface 109 and reflected therefrom. Except for the two regions having low fringe density (the interference fringe corresponding to the vicinity of the vertex, and the annular belt-like fringe), the phase cannot be measured because the fringe density is extremely high. Because the test surface 109 is an axisymmetric aspherical surface, such interference fringes are produced.

By driving a lead 111 (position control mechanism), the test surface 109 can be scanned in the direction of the interferometer optical axis. The moving distance of the test surface 109 is measured by a length measuring interferometer 24. When the test surface 109 is scanned, the region where the annular belt-like interference fringe is produced changes. Therefore, by repeating a set of the scanning of the test surface 109 and the phase measurement by the first CCD camera 171, the phase of the entire surface of the test surface 109 can be obtained.

On the other hand, in spite of scanning of the test surface 109, light is always substantially perpendicularly incident on the vicinity of the vertex of the test surface 109, and therefore the phase of the vicinity of the vertex can always be measured using the second CCD camera 206. For this reason, by correcting the moving distance of the test surface 109 measured using the length measuring interferometer 24 using the amount of change of the phase of the vicinity of the vertex, high-accuracy measurement of moving distance is achieved.

In Japanese Patent Application Publication No. 2008-532010 (Japanese translation of PCT/US2006/005029), the phase of the entire surface of the aspherical surface to be inspected is measured by scanning the test surface 109 in the direction of the interferometer optical axis, and the shape of the test surface 109 is measured by solving a predetermined equation using the phase of the entire surface of the aspherical surface to be inspected and the moving distance of the test surface 109.

However, in the case of the method disclosed in Japanese Patent Application Publication No. 2008-532010, the phase of the vicinity of the vertex can be measured only when light incident on the aspherical surface to be inspected is substantially perpendicularly reflected on the vertex of the aspherical surface to be inspected. Therefore, in the case of an aspherical surface the vertex portion of which has a non-axisymmetric shape, the phase of the vicinity of the vertex cannot be measured, the moving distance of the aspherical surface to be inspected cannot be measured accurately, and therefore the shape measurement accuracy decreases. Moreover, in the case of an aspherical object having a hole in the vertex portion, the interference fringe corresponding to the vicinity of the vertex cannot be obtained, and therefore the shape cannot be measured.

In addition, light reflected from the vicinity of the vertex of the aspherical surface to be inspected, light reflected from the reverse side of the object to be inspected or optical components in the interferometer is prone to be superimposed. Therefore, the accuracy of measurement of the phase of the vicinity of the vertex may decrease. For this reason, even if the moving distance of the aspherical surface to be inspected is corrected using the result of measurement of the phase of the vicinity of the vertex, sufficient accuracy may not be obtained.

SUMMARY OF THE INVENTION

One objective of the present invention is to provide an aspherical surface shape measuring technique that can be applied to a scanning interferometer and by which measurement can be performed with a higher degree of accuracy than by conventional methods.

In an aspect of the present invention, a shape measuring method includes irradiating a surface to be inspected and a reference spherical surface with light emitted from a light source, and measuring the shape of the surface to be inspected on the basis of an interference fringe pattern produced by interference between light to be inspected reflected on the surface to be inspected and reference light reflected on the reference spherical surface.

The method includes the step of step-scanning the surface to be inspected in multiple steps along the scan axis passing through the center of curvature of the reference spherical surface, the step of measuring the phase corresponding to a shape measurement region in an interference fringe pattern obtained using an imaging unit and measuring the wavelength of the light using a wavelength measuring device in each step of the step scanning, the step of defining the distance between any point on the surface to be inspected and the center of curvature of the reference spherical surface as a function of wavenumber (integer) including the measured phase and wavelength as parameters, calculating the wavenumber in each step from the relationship of the function between adjacent steps, and calculating the moving distance between each step, and the step of calculating a measurement value of the distance between any point on the surface to be inspected and the center of curvature of the reference spherical surface from the calculated wavenumber and the function, calculating a design value of the distance between any point on the surface to be inspected and the center of curvature of the reference spherical surface using the calculated moving distance, and calculating the shape error of the surface to be inspected from the difference between the measurement value and the design value.

By using the present invention, the moving distance of the aspherical surface to be inspected can be accurately measured only from the interference fringe (annular belt-like interference fringe) between light reflected from the reference spherical surface and light reflected from a region other than the vertex portion of the object to be inspected. Light reflected from the vertex of the aspherical surface is not necessary.

For this reason, even in the case of an aspherical surface having a hole at the vertex or an aspherical surface the vertex portion of which has a non-axisymmetric shape, the moving distance can be measured on the basis of high-accuracy phase data obtained by directly interferometrically measuring the surface of the aspherical surface. In addition, because the effect of light reflected from objects other than the aspherical surface to be inspected on the interference signal can be reduced, measurement can be performed with a higher degree of accuracy than by conventional methods.

Further features of the present invention will become apparent from the following description of exemplary embodiments with reference to the attached drawings.

DESCRIPTION OF THE EMBODIMENTS

The embodiments of the present invention will now be described in detail below with reference to the drawings.

First Embodiment

Figure 1:
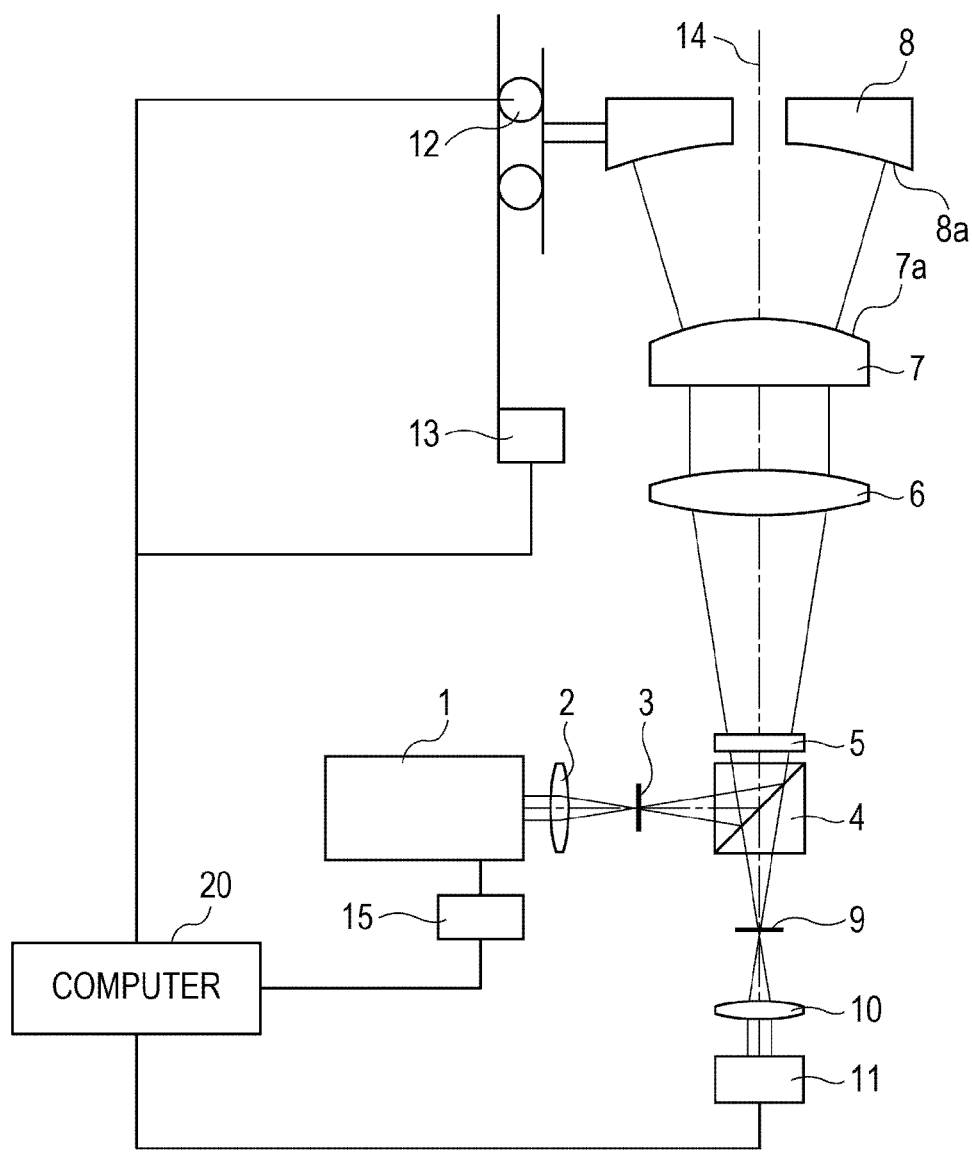
FIG. 1 is a schematic diagram of an interferometer apparatus according to a first embodiment of the present invention.

FIG. 1 is a schematic diagram of a shape measuring apparatus showing the configuration of a first embodiment to which the present invention can be applied. FIG. 1 shows a case where the shape of an object 8 to be inspected having an axisymmetric aspherical surface having a hole at the vertex is measured using an interferometer. Unlike conventional scanning interferometers, the present invention is characterized in that the moving distance $v_i$ of an object to be inspected is precisely measured on the basis only of the interference fringe pattern in the peripheral portion (the annular belt-like interference portion). The structure and operation of the shape measuring apparatus according to the first embodiment will be described in turn below with reference to the drawings.

In FIG. 1, measurement light emitted from a laser light source 1 (coherent light source) is projected onto an aspherical surface 8a to be inspected, by passing through a lens 2, an aperture 3, a polarizing beam splitter 4, a quarter wave plate 5, and a collimator lens 6. At the collimator lens 6, light is converted into a plane wave, and enters a Fizeau lens 7. Part of the measurement light entering the Fizeau lens 7 is reflected on a reference spherical surface 7a and forms reference light. On the other hand, the measurement light passing through the reference spherical surface 7a is converted into a spherical wave, is reflected on the aspherical surface 8a to be inspected, and becomes light to be inspected. Because a spherical wave is incident on an aspherical surface, only the measurement light substantially perpendicularly incident on the aspherical surface 8a to be inspected re-enters the reference spherical surface 7a.

The reference light reflected on the reference spherical surface 7a and the light to be inspected re-entering the reference spherical surface 7a both pass through the collimator 6 and the quarter wave plate 5 and enter the polarizing beam splitter 4. The reference light and the light to be inspected both pass through the quarter wave plate 5 twice, and their planes of polarization rotate 90 degrees. Therefore, the reference light and the light to be inspected pass through the polarizing beam splitter 4. After passing through the polarizing beam splitter 4, the reference light and the light to be inspected both pass through an aperture 9, a lens 10, reach a CCD camera 11 (imaging unit), and form an interference fringe pattern. By analyzing the interference fringe pattern observed on the CCD camera 11, the phase of the interference fringe pattern can be measured. The obtained image data of the interference fringe pattern is transmitted to a computer 20 and analyzed.

The object 8 to be inspected is mounted onto a position control mechanism 12. In this manner, the object 8 can be moved along the interferometer optical axis 14 by driving the position control mechanism 12. For example, according to an aspect of the present invention, an optical element position control mechanism 12 may include an optical element holding member which holds the object 8 and is linearly movable, a lead screw rotatable on a rotational axis extending parallel to a direction of movement of the object 8, and a linearly moving nut which is screw-engaged with the lead screw. Forward and reverse rotations of the lead screw can cause the linearly moving nut to move forward and rearward along the rotational axis of the lead screw, respectively, so that the object 8 moves along the optical axis 14 (scan axis). Thus, a position of the optical element holding member can be determined by the forward and rearward movements of the linearly moving nut. The optical element position control mechanism includes a driving device (e.g., a non-illustrated stepping motor) configured to rotate the lead screw in the desired direction of movement in response to positioning signals (scanning step signals) received from the computer 20. In this manner, the surface to be inspected can be step-scanned in multiple steps along the scan axis passing through the center of curvature of the reference spherical surface. As described above, the object 8 to be inspected is movably placed, and its moving distance can be measured by a length measuring device 13 (for example, a laser interferometer). The laser light source 1 is connected to a wavelength measuring device 15, and the change in wavelength can be measured at any time.

Figure 2:
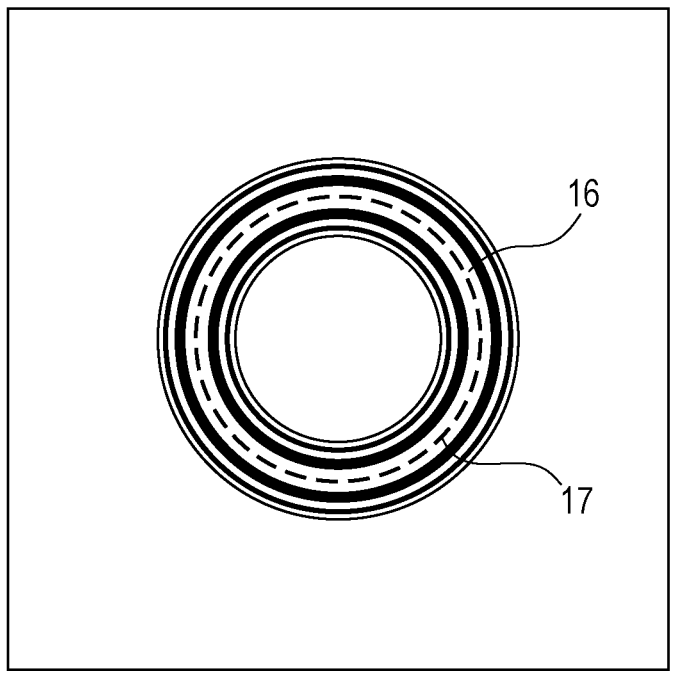
FIG. 2 is a schematic diagram showing an interference fringe pattern measured by the interferometer apparatus of the first embodiment.

FIG. 2 is a schematic diagram of an interference fringe pattern observed on the CCD camera 11. Because the object 8 to be inspected has a hole at the vertex portion, interference fringes corresponding to the vertex portion are not measured. Because only the light to be inspected substantially perpendicularly incident on the aspherical surface 8a to be inspected reaches the CCD camera 11, only the (annular belt-like) interference fringes corresponding to some regions on the aspherical surface 8a to be inspected are observed. In the case where the aspherical surface 8a to be inspected is an axisymmetric aspherical surface, interference fringes are distributed like annular belts as shown in FIG. 2. The region where the fringe density is low in the radial direction of the interference fringes will hereinafter be referred to as "phase measurement region 16."

In this region, the phase of interference fringe can be measured. The region corresponding to the light to be inspected perpendicularly reflected on the aspherical surface 8a to be inspected will hereinafter be referred to as "shape measurement region 17" (the region where the fringe density is low and the region corresponding to the vertex of the light portion). This region is shown by a dashed line in FIG. 2. In the present invention, the aspherical shape in the shape measurement region 17 can be measured.

When the object 8 to be inspected is moved along a scan axis along the interferometer optical axis 14 using the position control mechanism 12, the region on the aspherical surface 8a to be inspected where light is perpendicularly incident moves, and therefore the shape measurement region 17 also moves. Thus, by appropriately moving the object 8 to be inspected along the interferometer optical axis 14, the shape of the entire surface of the aspherical surface 8a to be inspected can be measured. The control of the shape measuring apparatus including the control of the position control mechanism 12, the length measuring device 13, the wavelength measuring device 15, and the CCD camera 11, and the analysis of obtained data are performed by the computer 20 that is a control unit.

Figure 3:
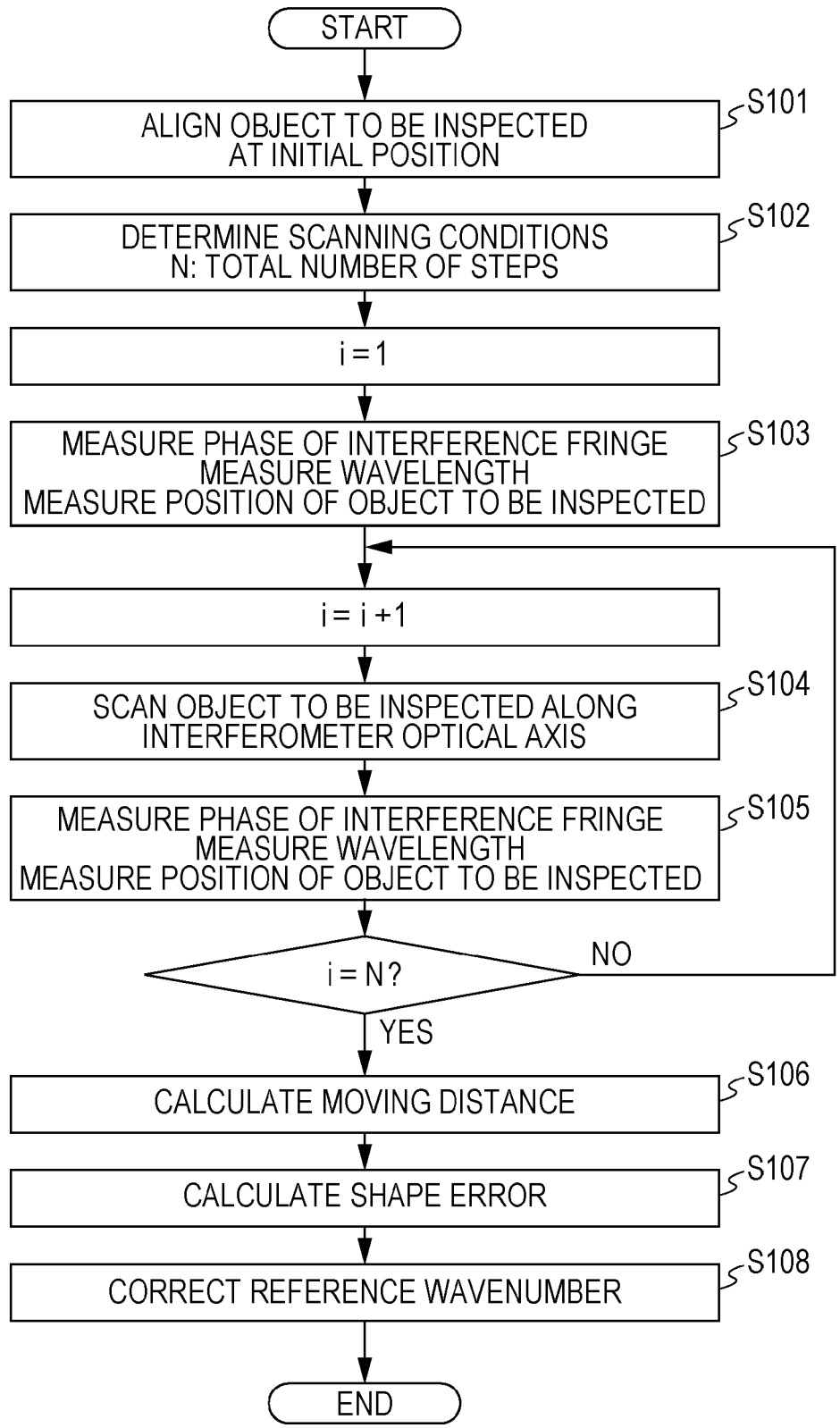
FIG. 3 is a flowchart in the case where the present invention is applied to the interferometer apparatus of the first embodiment.

The steps of a measuring method of the present invention will be described in sequence with reference to the flowchart of FIG. 3. First, an object 8 to be inspected is set in the interferometer and is aligned (step S101). The alignment of the object 8 to be inspected needs to be performed such that the phase of the entire region of the aspherical surface 8a to be inspected can be measured by appropriately scanning the object 8 to be inspected along the interferometer optical axis 14. In the case where the aspherical surface 8a to be inspected is an axisymmetrical aspherical surface, alignment is performed such that the aspherical surface axis coincides with the interferometer optical axis. The position of the object 8 to be inspected when the alignment is completed will hereinafter be referred to as "initial position." The initial position of the object 8 to be inspected is such a position that the shape measurement region 17 overlaps the optical effective region of the aspherical surface 8a to be inspected.

After aligning the object 8 to be inspected, scanning conditions are determined (step S102). Scanning conditions mean the total number N of steps in the step scanning of the aspherical surface 8a to be inspected, and the target moving distance of the object 8 to be inspected in the step scanning. The target moving distance of the object 8 to be inspected is determined such that the phase measurement regions 16 in any two adjacent steps overlap.

As is described in more detail below, because one step of the scanning of the object 8 to be inspected is extremely short distance, it is necessary to precisely measure how far the object 8 to be inspected moves after the scanning in one step, that is, the moving distance $v_i$ in the i-th step.

After determining the scanning conditions, the phase of the interference fringe pattern obtained using the CCD camera 11 is measured, the wavelength of the laser light source 1 is measured using the wavelength measuring device 15, and the position in the optical axis direction of the object 8 to be inspected is measured using the length measuring device 13 (step S103). For example, a laser interferometer may be used as the length measuring device 13, and the moving direction of the object 8 to be inspected relative to the Fizeau lens 7 may be measured. The moving direction obtained using the length measuring device 13 is just a reference value, and the precise determination of the moving direction is performed on the basis of phase information obtained from the imaged interference fringe pattern.

According to the scanning conditions, the movement of the object 8 to be inspected, the measurement of the phase of interference fringe, the measurement of the wavelength, and the measurement of the position of the object 8 to be inspected are repeated (step S104 and step S105) a predetermined number of times N.

Using the phase of interference fringe, the wavelength, and the information on the position of the object 8 to be inspected in each step measured as above, the shape of the aspherical surface 8a to be inspected is calculated. The shape calculation is divided into three steps: the moving distance calculating step of step S106, the shape error calculating step of step S107, and the reference wavenumber correcting step of step S108. The details of each step will be described below.

Figure 4:
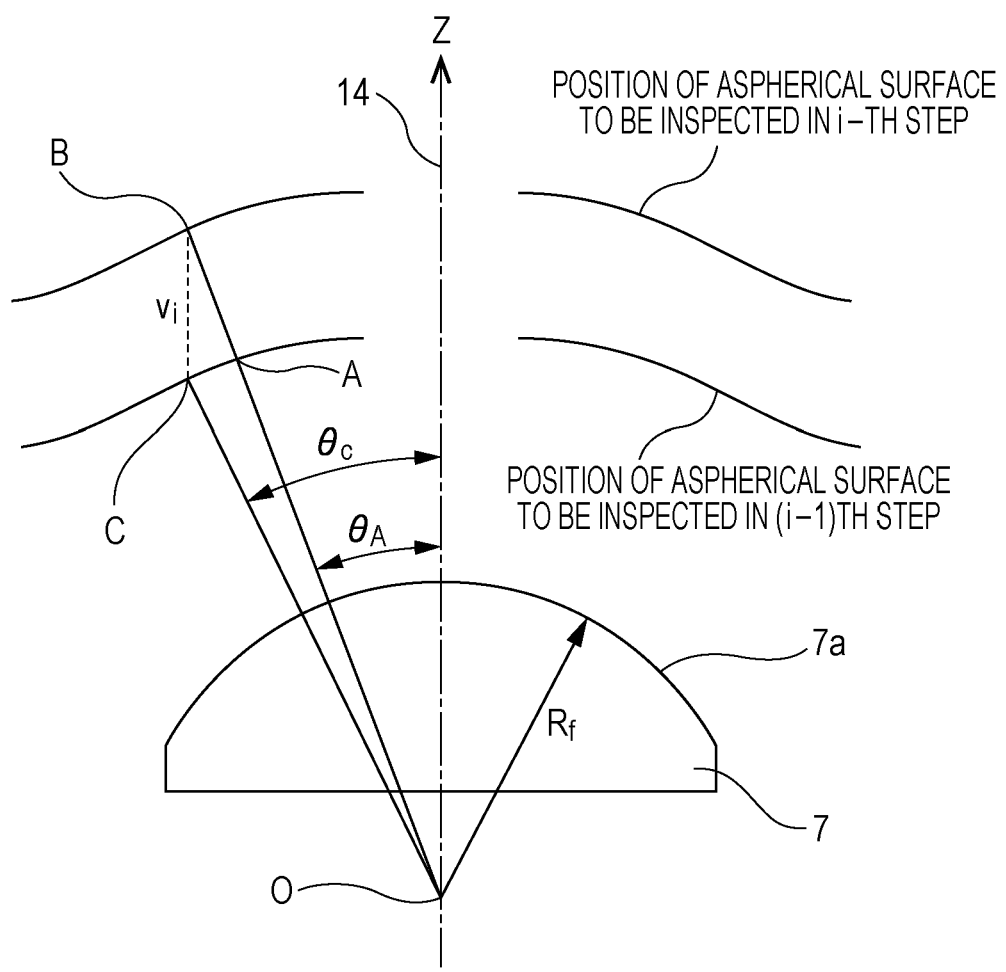
FIG. 4 is a schematic diagram for illustrating the moving distance calculating step of the present invention in the first embodiment.

First, the calculation of moving distance of step S106 will be described with reference to FIG. 4. In step S106, the moving distance of the object 8 to be inspected is obtained with a high degree of accuracy from the phases of interference fringe and the information on the position of the object to be inspected before and after the movement of the object to be inspected. FIG. 4 shows the positional relationship "before and after" the movement of the aspherical surface 8a to be inspected from the position in the (i−1)th step (before) to the position in the i-th step (after).

Focusing attention on a point A on the aspherical surface 8a to be inspected in the (i−1)th step, the distance between the point A and the center O of curvature of the reference spherical surface 7a can be expressed by the following equation (1):

$$\overline{OA} = R_f + \left(n_{i-1} + \frac{\phi_{i-1}(\theta_A, \psi_A)}{2\pi}\right)\frac{\lambda_{i-1}}{2} \quad (1)$$

where $R_f$ is the curvature radius of the reference spherical surface 7a, $n_{i-1}$ is the wavenumber (integer) in the (i−1)th step, and $\lambda_{i-1}$ is the wavelength measured by the wavelength measuring device 15 in the (i−1)th step. The curvature radius $R_f$ of the reference spherical surface 7a can be preliminarily measured and known. However, $R_f$ may be made known by using a nominal value such as a design value, and may be corrected in the reference wavenumber correcting step of step S108 to be described later. $\theta_A$ is the vertex angle between the line segment OA and the interferometer optical axis 14, and $\psi_A$ is the angle of rotation about the interferometer optical axis 14. $\phi_{i-1}(\theta_A, \psi_A)$ shows the phase of the interference fringe in the (i−1)th step at $\theta_A$ and $\psi_A$ and is calculated as a value of 0 to $2\pi$ from the measured interference fringe. While the phase ($\phi_{i-i}$ is calculated from the interference fringe pattern obtained by the CCD camera 11, $\phi_{i-1}(\theta_A, \psi_A)$ can be determined by preliminarily measuring the relationship between each pixel of the CCD camera 11 and the vertex angle. The relationship between each pixel of the CCD camera 11 and the vertex angle $\theta_A$ can be measured by an existing technique such as measuring a standard having a mark on the optical surface, or obtaining from the change in phase when misalignment is given to an aspherical lens. Therefore, in the equation (1), only the integer portion of the wavenumber in the (i−1)th step is unknown. Next, if the point of intersection between a straight line passing through the point A and the point O and the aspherical surface 8a to be inspected in the i-th step is denoted by B, the distance OB between the point B and the point O can be expressed by the following equation (2):

$$\overline{OB} = R_f + \left(n_i + \frac{\phi_i(\theta_A, \psi_A)}{2\pi}\right)\frac{\lambda_i}{2} \quad (2)$$

where $n_i$ is the integer portion of the wavenumber in the i-th step, $\phi_i(\theta_A, \psi_A)$ is the phase of interference fringe in the i-th step at $\theta_A$ and $\psi_A$, and $\lambda_i$ is the wavelength measured by the wavelength measuring device 15 in the i-th step. Also in equation (2), only the integer portion $n_i$ of the wavenumber in the i-th step is unknown, and the other values are known values or measurable values.

The coordinate where the point B, which is a point on the aspherical surface 8a to be inspected in the i-th step, is located before moving along the interferometer optical axis 14 (that is, in the (i−1)th step) will be denoted by point C. Because the point C is a point on the aspherical surface 8a to be inspected in the (i−1)th step, the distance between the point C and the point O is expressed by the following equation (3):

$$\overline{OC} = R_f + \left(n_{i-1} + \frac{\phi_{i-1}(\theta_C, \psi_A)}{2\pi}\right)\frac{\lambda_{i-1}}{2} \quad (3)$$

where $\theta_C$ is the vertex angle between the segment OC and the interferometer optical axis 14. The angle of rotation about the interferometer optical axis 14 is common to the points A, B, and C, and is $\psi_A$. In the equation (3), the distance between the point C and the point O is expressed by various parameters in the (i−1)th step.

On the other hand, because the point C is translated along the interferometer optical axis 14 to the point B, if the moving distance the aspherical surface 8a to be inspected has moved along the interferometer optical axis 14 from the (i−1)th step to the i-th step is denoted by $v_i$, the following equations (4) and (5) hold:

$$\overline{OC}\sin\theta_C = \overline{OB}\sin\theta_A \quad (4)$$

$$\overline{OC}\cos\theta_C = \overline{OB}\cos\theta_A - v_i \quad (5)$$

Substituting the equation (2) into the equation (4) yields the following equation (6):

$$\overline{OC} = \left(R_f + \left(n_i + \frac{\phi_i(\theta_A, \psi_A)}{2\pi}\right)\frac{\lambda_i}{2}\right)\frac{\sin\theta_A}{\sin\theta_C} \quad (6)$$

The equation (6) differs from the equation (3) in that the distance between the point C and the point O is expressed by various parameters in the i-th step. From the equations (3) and (6), the following equation (7) is obtained:

$$\left(R_f + \left(n_{i-1} + \frac{\phi_{i-1}(\theta_C, \psi_A)}{2\pi}\right)\frac{\lambda_{i-1}}{2}\right)\sin\theta_C = \quad (7)$$
$$\left(R_f + \left(n_i + \frac{\phi_i(\theta_A, \psi_A)}{2\pi}\right)\frac{\lambda_i}{2}\right)\sin\theta_A$$

In the equation (7), $n_{i-1}$, $n_i$, and $\theta_C$ are unknown parameters. However, $\theta_C$ can be obtained from the following equation (8) obtained from the equations (4) and (5):

$$\tan\theta_C = \frac{\overline{OB}\sin\theta_A}{\overline{OB}\cos\theta_A - v_i} \quad (8)$$

When the equation (2) is substituted into the equation (8), and the result of measurement of the position of the object 8 to be inspected in each step is used for the moving distance $v_i$, $\theta_C$ can be expressed as a function of $n_i$. Therefore, unknown parameters in the equation (7) are the integer portions $n_{i-1}$ and $n_i$ of wavenumbers. Because both $n_{i-1}$ and $n_i$ are integers, all unknowns can be determined by determining the combination of $n_{i-1}$ and $n_i$ such that the difference between both sides of the equation (7) is minimized.

However, when the difference between and $n_i$ is constant, the difference between both sides of equation (7) is constant, and therefore the combination of and $n_i$ cannot be determined uniquely. So, let the integer portion of wavenumber in any one of the steps be the reference wavenumber, and the reference wavenumber is set from the design value of the aspherical surface 8a to be inspected and the scanning conditions. Using the reference wavenumber, the values of the integer portions of wavenumbers in the other steps are determined. For example, let the value $n_1$ of the integer portion of wavenumber at the initial position be the reference wavenumber, and the value of $n_1$ is determined from the target alignment attitude and the design value of the aspherical surface 8a to be inspected. In the second step, the integer portion $n_2$ of wavenumber is determined from the equation (7) and the value of the reference wavenumber preliminarily determined as above. By calculating in the same manner, the values of integer portions $n_1, n_2, n_3, \ldots, n_{i-1}, n_i, \ldots, n_N$ of wavenumbers in all the steps can be determined one after another.

The value of the reference wavenumber may be corrected in the reference wavenumber correcting step of step S108 to be described later. After determining the values of integer portions of wavenumbers in all the steps, finally, the moving distance $v_i$ is determined. This is performed by substituting the determined values of integer portions of wavenumbers into the integer portions $n_{i-1}$ and $n_i$ of wavenumbers of the equations (2) and (7) and then determining the moving distance vi of the equation (8) such that the difference between both sides of the equation (7) is minimized.

By performing the above calculation, a high-accuracy moving distance $v_i$ based on the result of measurement of the phase of the aspherical surface 8a to be inspected can be obtained. When obtaining the moving distance $v_i$, positional information of the object 8 to be inspected measured using the length measuring device 13 is used. This positional information is used only to determine the integer portion of wavenumber, and an accuracy of about $1/10$ of the wavelength of the laser light source 1 suffices. Because the moving distance calculation of step S106 can be performed throughout the region where the phase measurement regions 16 of adjacent steps overlap each other, the accuracy can be increased by calculating the moving distance $v_i$ of each pixel and calculating the mean.

After calculating the moving distance of the aspherical surface 8a to be inspected in the step of step S106, the shape error calculating step of step S107 is performed to calculate the shape error, that is, the difference between the designed shape and the shape of the aspherical surface 8a to be inspected. The calculation of shape error is performed with respect to the shape measurement region 17 in FIG. 2, that is, the region corresponding to the light to be inspected perpendicularly reflected on the aspherical surface 8a to be inspected.

Figure 5:
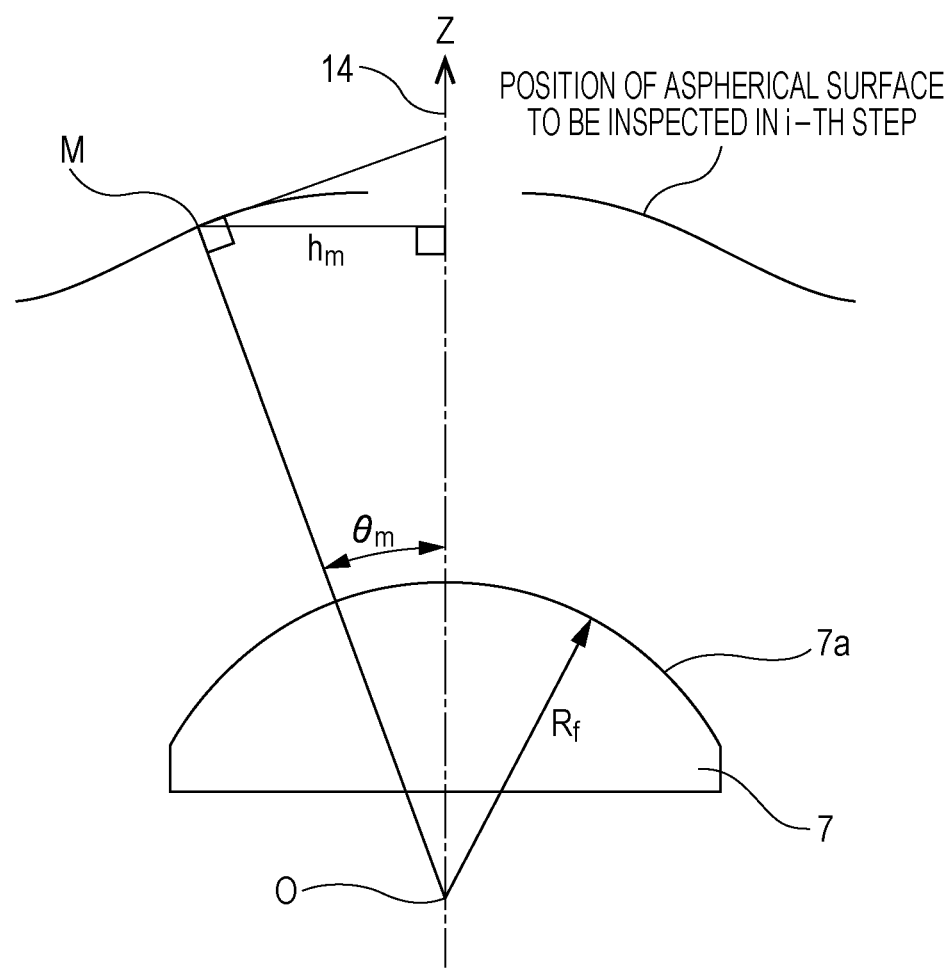
FIG. 5 is a schematic diagram for illustrating the shape error calculating step of the present invention in the first embodiment.

FIG. 5 shows the positional relationship between the aspherical surface 8a to be inspected and the reference spherical surface 7a in the i-th step. In FIG. 5, if M denotes a point corresponding to the shape measurement region 17 in the i-th step, the straight line passing through the point M and the center O of curvature is perpendicular to the tangent plane of the aspherical surface 8a to be inspected at the point M. The measurement value of the length of the line segment OM can be expressed, in the same manner as the equation (2), by the following equation (9):

$$\overline{OM}_m = R_f + \left(n_i + \frac{\phi_i(\theta_m, \psi_m)}{2\pi}\right)\frac{\lambda_i}{2} \tag{9}$$

where $\theta_m$ is the vertex angle between the line segment OM and the interferometer optical axis 14, and $\psi_m$ is the angle of rotation about the interferometer optical axis 14. The subscript m of the line segment OM shows that it is a measurement value. By comparing the length of the line segment OM with the design value (designed shape) of the aspherical surface 8a to be inspected, the shape error in the surface normal direction is calculated. Taking into account the fact that the line segment OM is perpendicular to the tangent plane of the aspherical surface to be inspected, the design value of the length of the line segment OM is expressed by the following equation (10):

$$\overline{OM}_d = \sqrt{\left(\frac{h_m}{Z'(h_m)}\right)^2 + h_m^2} \tag{10}$$

where $h_m$ is the abscissa of the point M, that is, the measurement value of the length of the perpendicular from the point M to the interferometer optical axis 14, and $Z'(h_m)$ is a value obtained by substituting $h_m$ into a derivative of the design equation of the aspherical surface 8a to be inspected. The subscript d of the line segment OM shows that it is a design value.

The abscissa $h_m$ is obtained from the measurement value of the moving distance $v_i$, the initial position, and the design equation of the aspherical surface 8a to be inspected. If the distance from the center O of curvature of the reference spherical surface 7a to the point of intersection of the aspherical surface 8a to be inspected at the initial position with the interferometer optical axis 14 is denoted by L, $h_m$ satisfies the following equation (11):

$$L + \sum_{k=2}^{i} v_k = Z(h_m) + \frac{h_m}{Z'(h_m)} \tag{11}$$

After substituting the moving distance to the i-th step into the equation (11), $h_m$ is determined so as to satisfy the equation (11). L determined from the initial position is calculated on the assumption that alignment is performed in a targeted manner, and is corrected according to the shape error calculation result after step S107. In this embodiment, the aspherical surface 8a to be inspected has a hole and therefore the point of intersection of the aspherical surface 8a to be inspected with the interferometer optical axis 14 does not exist physically. However, it can be defined by a mathematical expression using the design equation.

When $h_m$ is obtained using the equation (11), $\theta_m$ in the equation (9) can also be obtained from the design equation. Because the relationship between each pixel of the CCD camera 11 and the vertex angle is known, the phase measurement result $\phi_i(\theta_m, \psi_m)$ corresponding to the point M can be obtained. The phase measurement result $\phi_i(\theta_m, \psi_m)$ can also be obtained without using $\theta_m$, only from the value of the phase of interference fringe in the i-th step. This is a method utilizing the fact that the phase of interference fringe shows an extreme value at the point M. After removing the inclination component from the result of measurement of the phase of interference fringe, the extreme value of the phase of interference fringe in a section in the radial direction is obtained. This extreme value can be used as $\phi_i(\theta_m, \psi_m)$. From the above calculation, the shape error $\Delta n$ of the aspherical surface $8a$ to be inspected at the abscissa $h_m$ can be obtained as the difference between the measurement value and the design value from the following equation (12):

$$\Delta n(h_m) = \overline{OM}_m - \overline{OM}_d \quad (12)$$

By performing the shape error calculation according to the equation (12) throughout the shape measurement region 17, and then performing the same calculation throughout all the steps, the shape of the entire surface of the aspherical surface $8a$ to be inspected can be obtained.

However, when the obtained shape error includes many components that are changed by translating or inclining the object 8 to be inspected (alignment error components), L in the equation (11) has an error. For this reason, it is desirable to obtain the shape error caused by alignment error, to quantify the amount of alignment error, to correct L according to the obtained amount of alignment error, and to recalculate the shape error.

Although the shape of the aspherical surface 8a to be inspected can be obtained from the above calculation, the reference wavenumber determined in step S106 is provisional. So, the step of correcting the reference wavenumber such that the residual shape after removing the alignment error component from the shape error of the entire surface of the aspherical surface 8a to be inspected is minimized and thereby obtaining the final shape measurement result (step S108) may be added.

When the curvature radius $R_f$ of the reference spherical surface 7a is unknown, the correction of the curvature radius of the reference spherical surface is performed together with the correction of the reference wavenumber. When the integer portion of the wavenumber at the initial position is the reference wavenumber, $R_f$ can be expressed, using the result of measurement of the wavelength, by the following equation (13).

$$R_f = \left(n_{RF} + \frac{\Delta RF_1}{2\pi}\right)\frac{\lambda_1}{2}, \quad -\pi \le \Delta RF_1 < \pi \quad (13)$$

where $n_{RF}$ is an integer, and the value of $\Delta RF_1$ is determined from the design value of the reference spherical surface 7a. Using the result of measurement of the wavelength in the i-th step and $n_{RF}$ and $\Delta RF_1$, $R_f$ can be expressed by the following equation (14):

$$R_f = \left(n_{RF} + \frac{\Delta RF_1}{2\pi}\right)\frac{\lambda_i}{2}, \quad \Delta RF_i = \Delta RF_1 \frac{\lambda_1}{\lambda_i} + n_{RF}\frac{2\pi}{\lambda_i}(\lambda_1 - \lambda_i) \quad (14)$$

Substituting the equation (14) into the equation (2) yields the following equation (15):

$$\overline{OB} = \left(n_i + n_{RF} + \frac{\phi_i(\theta_A, \psi_A) + \Delta RF_i}{2\pi}\right)\frac{\lambda_i}{2} \quad (15)$$

Similarly, by substituting the equation (14) into the equations (7) and (9), $n_i + n_{RF}$ can be treated as an integer. By letting $n_i + n_{RF}$ be the reference wavenumber and performing the reference wavenumber correction in step S108, the curvature radius of the reference spherical surface 7a can also be corrected.

When the equation (13) is used, $\Delta RF_1$ remains as an uncertain amount, and the error of $\Delta RF_1$ is up to $2\pi$. For this reason, the shape measurement error of up to half of the wavelength of the laser light source 1 is superimposed evenly throughout the entire surface. However, the even shape measurement error throughout the entire surface can be absorbed by regulating the interval between optical elements combined into a lens barrel. Therefore, if a measurement error of up to half the wavelength occurs, it is not a practical problem.

The present invention is especially suitable for an object to be inspected having no vertex portion on the surface to be inspected, such as a lens having a hole.

However, it goes without saying that the present invention can measure a lens having a vertex portion.

Second Embodiment

Figure 6:
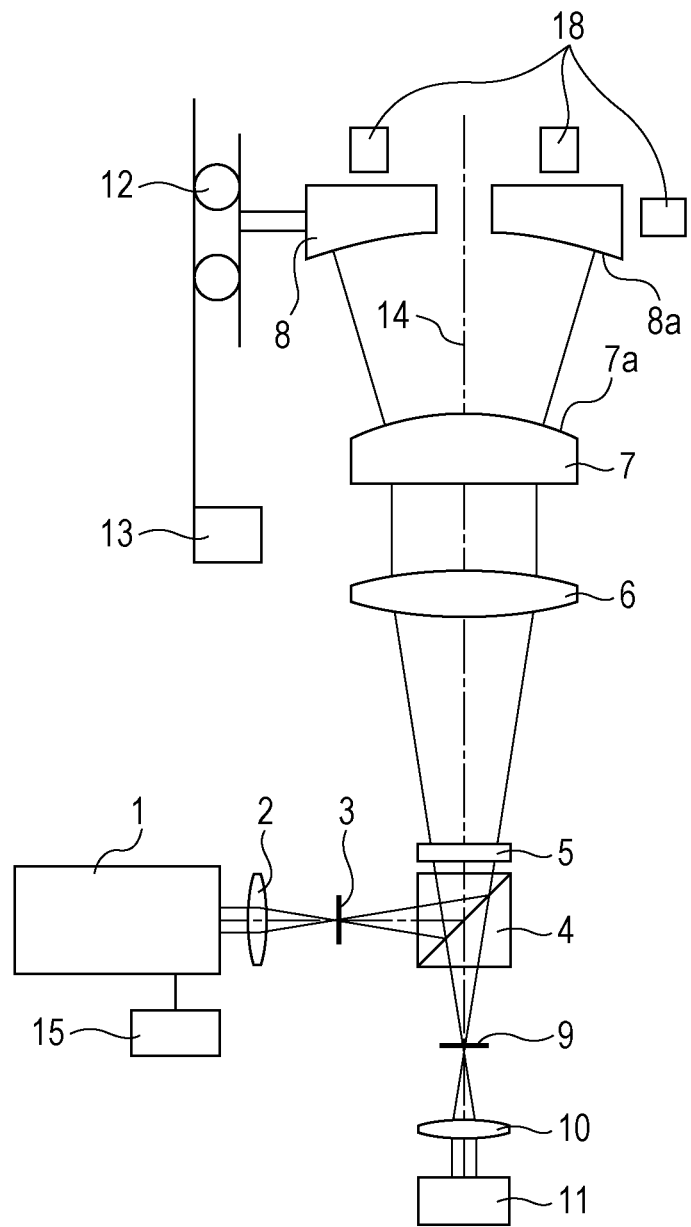
FIG. 6 is a schematic diagram of an interferometer apparatus according to a second embodiment of the present invention.

FIG. 6 is a schematic diagram showing the configuration of a second embodiment to which the present invention can be applied. The second embodiment differs from the first embodiment in that the second embodiment has a positional attitude measuring device 18, and can measure the inclination of the object 8 to be inspected and the position of the object 8 to be inspected in a plane perpendicular to the interferometer optical axis 14.

Figure 7:
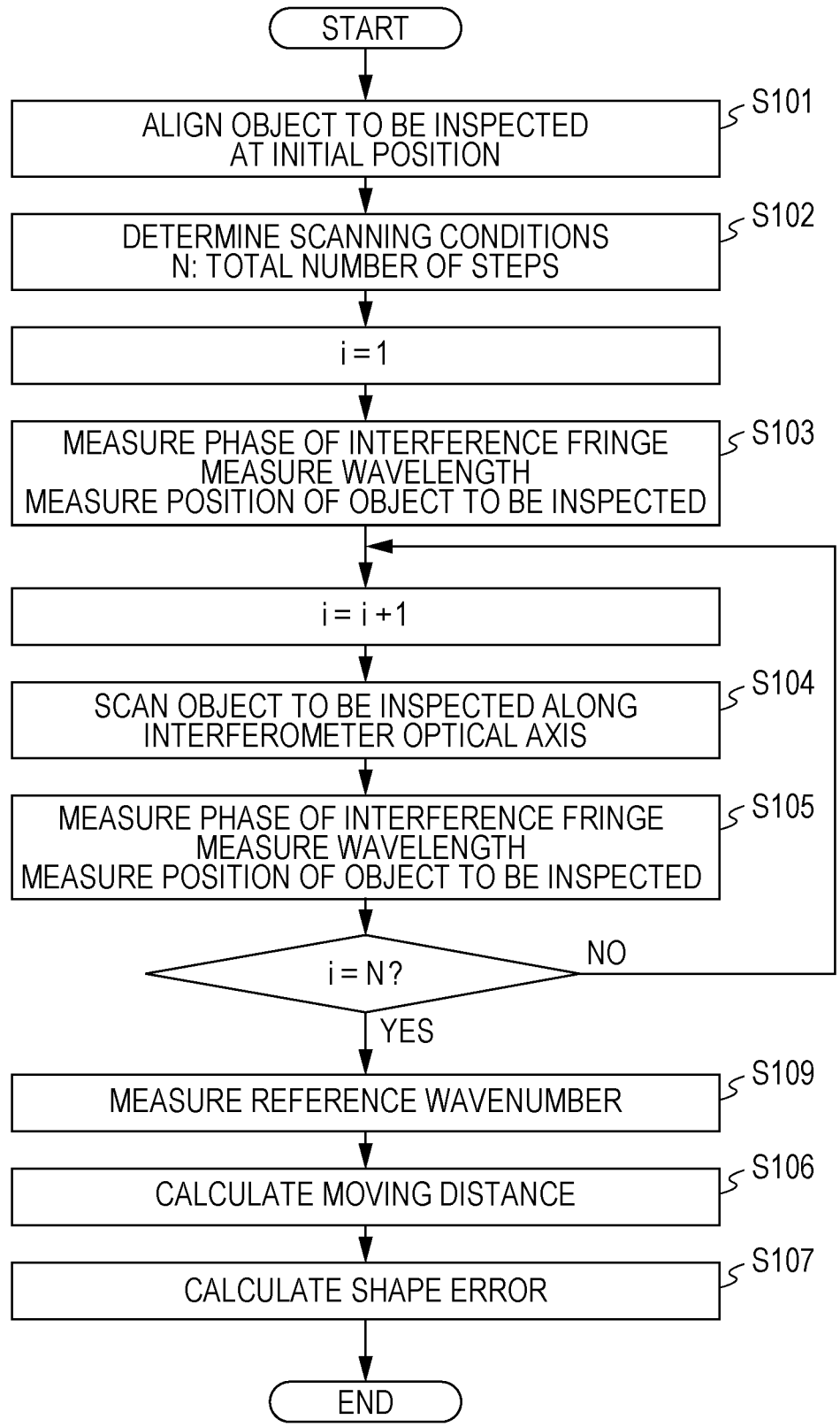
FIG. 7 is a flowchart in the case where the present invention is applied to the interferometer apparatus of the second embodiment.

FIG. 7 shows a flowchart of the second embodiment. The second embodiment is characterized in that it has the reference wavenumber measuring step of step S109 instead of the reference wavenumber correcting step of step S108. The reference wavenumber measuring step of step S109 will be described with reference to FIGS. 8 and 9.

Figure 8:
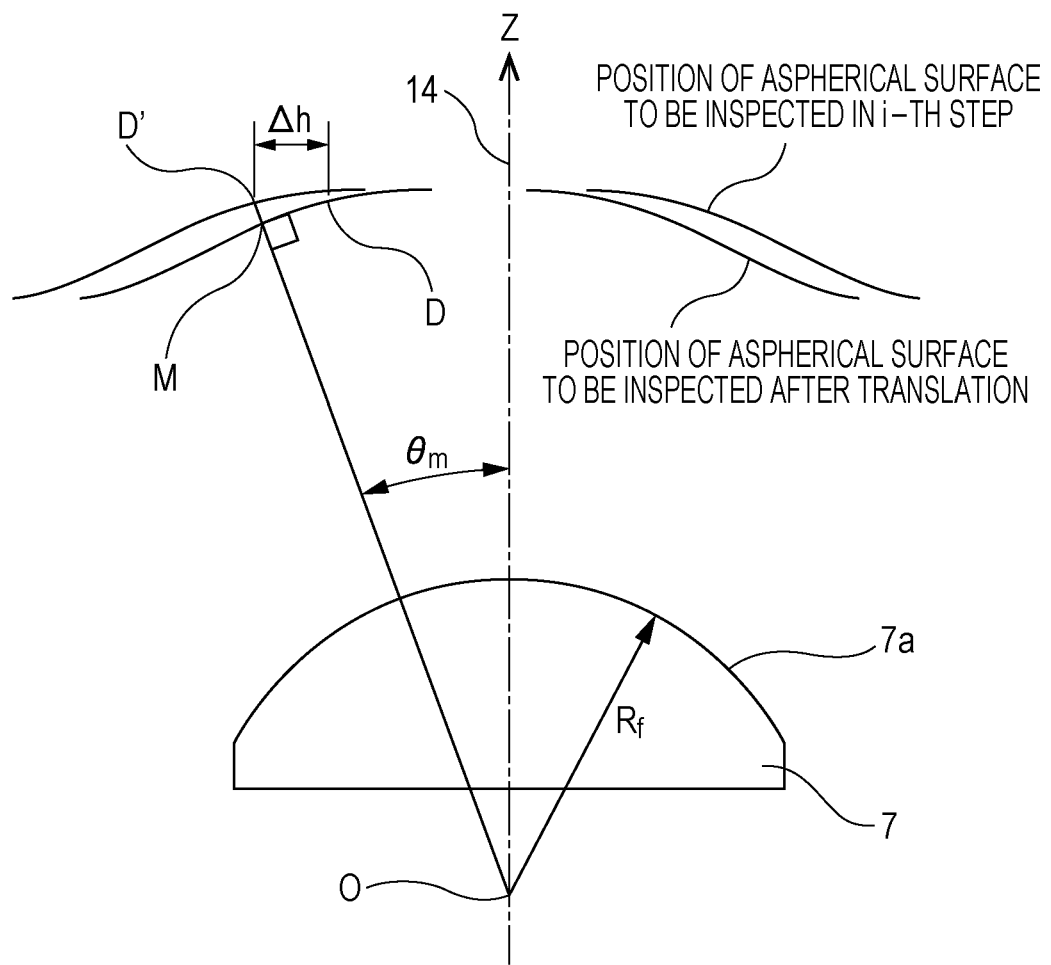
FIG. 8 is a schematic diagram for illustrating the reference wavenumber measuring step of the present invention in the second embodiment.

FIG. 8 shows the positional relationship in the case where the aspherical surface 8a to be inspected in the i-th step is translated in a plane perpendicular to the interferometer optical axis 14. FIG. 8 schematically depicts the aspherical surface 8a to be inspected displaced to the left in the figure relative to the interferometer optical axis.

The point M is a point corresponding to the shape measurement region 17 in the i-th step, the point O is the center of curvature of the reference spherical surface 7a, and $\theta_m$ is the vertex angle between the line segment OM and the interferometer optical axis 14. The point of intersection between a straight line passing through the point O and the point M and the aspherical surface 8a to be inspected after translation is denoted by D', and the coordinate where the point D' is located before translation is denoted by D. If the translation distance is denoted by $\Delta h$, the length of the line segment joining the points D and D' is $\Delta h$.

When $\Delta h$ is minute, both points D and M can be regarded as points on a sphere centering at the point O and having a radius equal to the length of the line segment OM, and therefore the following equations (16) and (17) hold:

$$\overline{OM}^2 = ((\overline{OM} + \Delta R)\sin\theta_m - \Delta h)^2 + ((\overline{OM} + \Delta R)\cos\theta_m)^2 \quad (16)$$

$$\Delta R = \frac{\phi_s(\theta_m, \psi_m)\lambda_s - \phi_i(\theta_m, \psi_m)\lambda_i}{4\pi} \quad (17)$$

where $\phi_s(\theta_m, \psi_m)$ is the phase after translation at the vertex angle $\theta_m$ and the angle $\psi_m$ of rotation about the interferometer optical axis 14, and $\lambda_s$ expresses the result of measurement of the wavelength after translation measured using the wavelength measuring device 15. Because $\Delta h$ is minute, the interference fringe density after translation is kept low. Therefore, $\phi_s(\theta_m, \psi_m)$ can be measured from the obtained interference fringe pattern. Because $\Delta h$ can be measured using the positional attitude measuring device 18, the length of the line segment OM can be obtained from the equations (16) and (17). By determining $n_i$ such that the difference between the length of the line segment OM obtained from the equations (16) and (17) and the length of the line segment OM obtained from the equation (9) is minimized, the integer portion $n_i$ of wavenumber in the i-th step can be obtained.

The equations (16) and (17) are equations in the case where the aspherical surface 8a to be inspected is translated in a plane perpendicular to the interferometer optical axis 14. When the aspherical surface 8a to be inspected is inclined to the interferometer optical axis 14, the reference wavenumber can also be measured.

Figure 9:
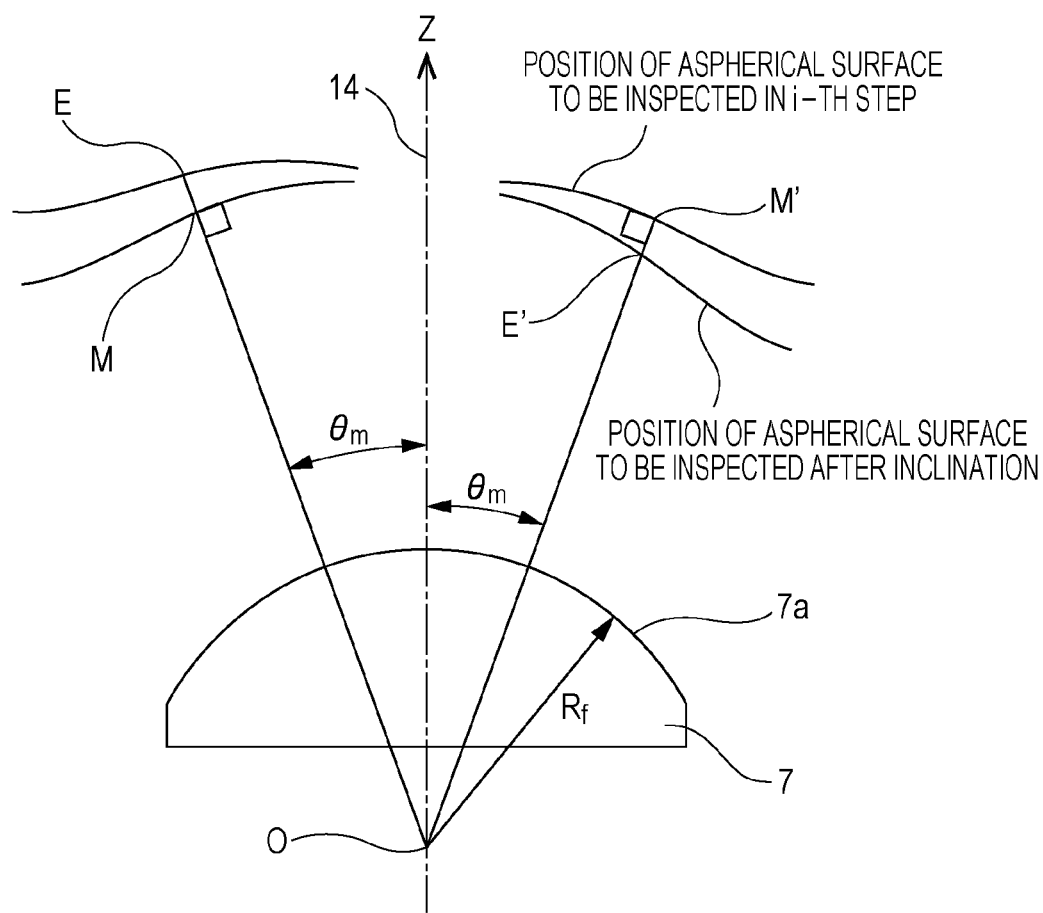
FIG. 9 is a schematic diagram for illustrating the reference wavenumber measuring step of the present invention in the second embodiment.
Figure 10:
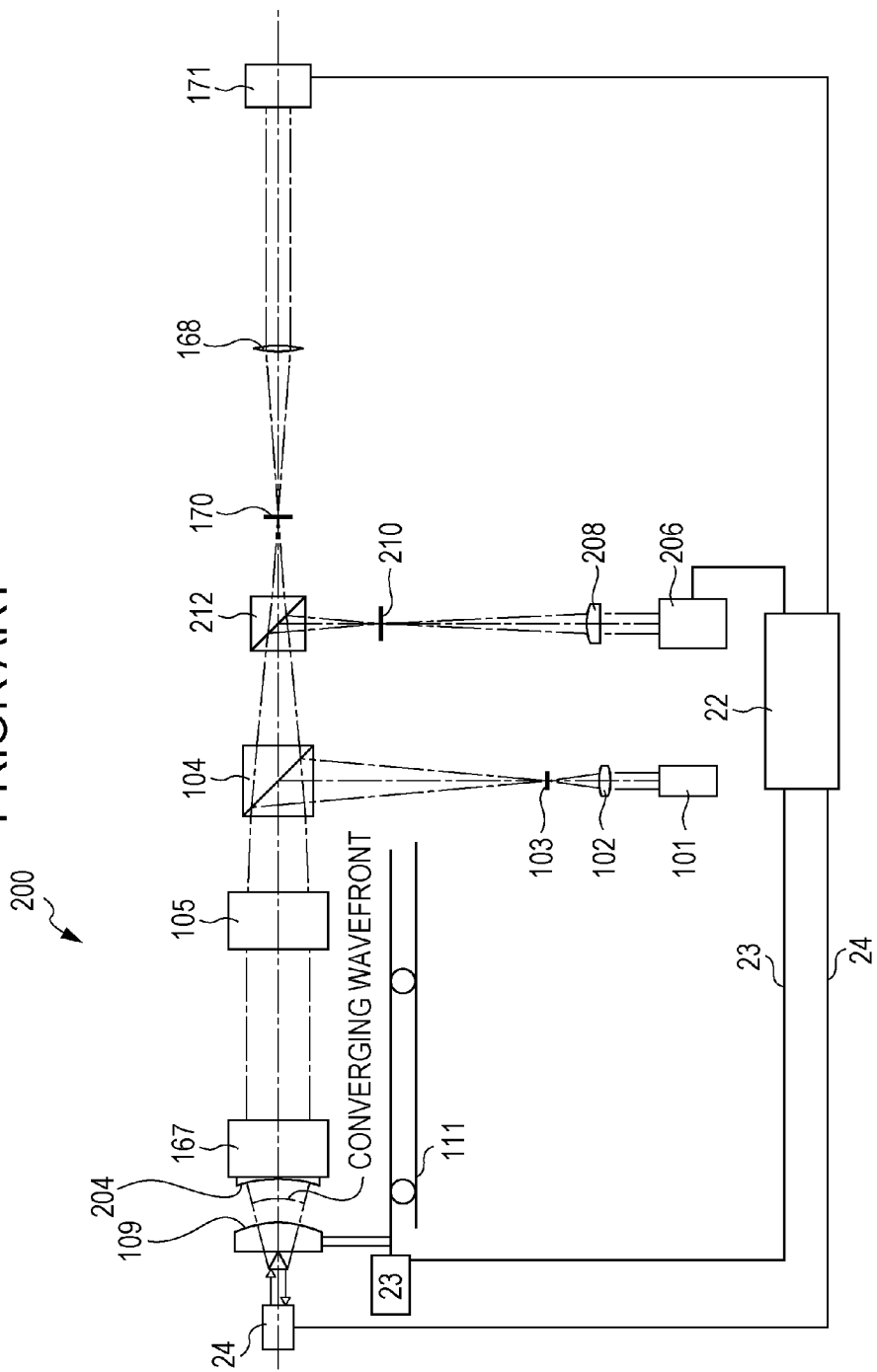
FIG. 10 is a schematic diagram of a conventional interferometer apparatus.
Figure 11:
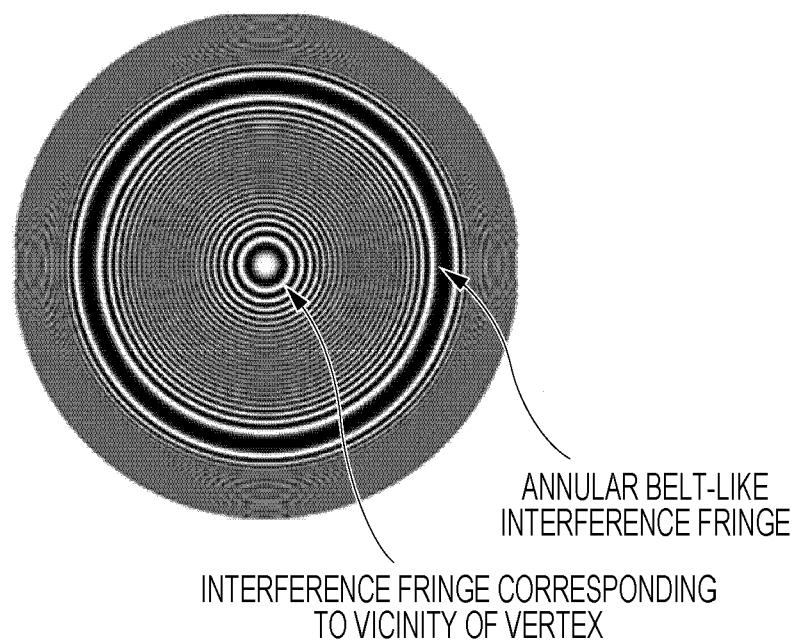
FIG. 11 shows an interference fringe pattern obtained in a conventional scanning interferometer.

FIG. 9 shows the positional relationship in the case where the aspherical surface 8a to be inspected in the i-th step is inclined $\Delta\theta$ to the interferometer optical axis 14. FIG. 9 schematically depicts the aspherical surface 8a to be inspected slightly displaced in the clockwise direction.

The point M is a point on the shape measurement region 17 in the i-th step, the point O is the center of curvature of the reference spherical surface 7a, and $\theta_m$ is the vertex angle between the line segment OM and the interferometer optical axis 14. The point M' is a point on the aspherical surface 8a to be inspected that bears a point-symmetrical relationship to the point M about the interferometer optical axis 14. For this reason, the vertex angle between the line segment OM' and the interferometer optical axis 14 is also $\theta_m$. The point of intersection between a straight line passing through the point O and the point M and the aspherical surface 8a to be inspected after inclination is denoted by E, and the point of intersection between a straight line passing through the point O and the point M' and the aspherical surface 8a to be inspected after inclination is denoted by E'. When $\Delta\theta$ is minute, the following equations (18), (19), and (20) hold:

$$2\Delta\theta \overline{OM} \sin\theta_m = (\Delta R - \Delta R') \tag{18}$$

$$\Delta R = \frac{\phi_T(\theta_m, \psi_m)\lambda_T - \phi_i(\theta_m, \psi_m)\lambda_i}{4\pi} \tag{19}$$

$$\Delta R' = \frac{\phi_T(\theta_m, \psi_m + \pi)\lambda_T - \phi_i(\theta_m, \psi_m + \pi)\lambda_i}{4\pi} \tag{20}$$

where $\phi_T(\theta_m, \psi_m)$ is the phase after inclination at the vertex angle $\theta_m$ and the angle $\psi_m$ of rotation about the interferometer optical axis 14, and $\lambda_T$ expresses the wavelength after inclination. Because $\Delta\theta$ can be measured using the positional attitude measuring device 18, the length of the line segment OM can be obtained from the equations (18), (19), and (20). By determining $n_i$ such that the difference between the length of the line segment OM obtained from the equations (18), (19), and (20) and the length of the line segment OM obtained from the equation (9) is minimized, the integer portion $n_i$ of wavenumber in the i-th step can be obtained.

By letting the integer portion of wavenumber in the i-th step obtained as above be the reference wavenumber and performing the moving distance calculating step of step S106 and the shape error calculating step of step S107, the shape error of the aspherical surface 8a to be inspected can be measured.

Compared to the first embodiment, the second embodiment is characterized in that while a positional attitude measuring device 18 is necessary, the absolute value of the reference wavenumber can be measured. For this reason, even when the aspherical surface 8a to be inspected differs significantly from the design shape, the shape error of the aspherical surface 8a to be inspected can be measured with a high degree of accuracy.

In the flowchart shown in FIG. 7, the reference wavenumber measuring step is performed after all the steps of the scanning are completed. However, the reference wavenumber measuring step may be performed before the scanning or after the measurement of any step. By performing the wavenumber measurement in a plurality of steps and calculating the mean, the accuracy of measurement of the reference wavenumber can be improved. The present invention is suitable for the measurement of the optical surface of a lens requiring high shape accuracy.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-210902 filed Sep. 21, 2010, which is hereby incorporated by reference herein in its entirety.

What is claimed is:

1. A shape measuring method for measuring aspherical optical surfaces, comprising:
   irradiating a surface to be inspected and a reference spherical surface with light emitted from a light source so as to generate an interference fringe pattern produced by interference between light to be inspected reflected on the surface to be inspected and reference light reflected on the reference spherical surface;
   step-scanning the surface to be inspected in multiple steps along a scan axis passing through the center of curvature of the reference spherical surface;
   measuring a phase corresponding to a shape measurement region in the interference fringe pattern obtained using an imaging unit and measuring the wavelength of the light emitted from the light source using a wavelength measuring device in each step of the step scanning;
   defining a distance between any point on the surface to be inspected and the center of curvature of the reference spherical surface as a function of wavenumber including the measured phase and wavelength as parameters, calculating the wavenumber in each step from the relationship of the function between adjacent steps, and calculating the moving distance between each step; and
   calculating a measurement value of the distance between any point on the surface to be inspected and the center of curvature of the reference spherical surface from the calculated wavenumber and the function, calculating a design value of the distance between any point on the surface to be inspected and the center of curvature of the reference spherical surface using the calculated moving distance, and calculating a shape error of the surface to be inspected from the difference between the measurement value and the design value.

2. The shape measuring method according to claim 1, wherein the function in an (i-1)th step of the step-scanning step is expressed by the following equation (1):

$$\overline{OA} = R_f + \left(n_{i-1} + \frac{\phi_{i-1}(\theta_A, \psi_A)}{2\pi}\right)\frac{\lambda_{i-1}}{2} \tag{1}$$

where OA is a light segment corresponding to the distance between the center O of curvature of the reference spherical surface and a point A on the surface to be inspected, $R_f$ is the curvature radius of the reference spherical surface, $n_{i-1}$ is the wavenumber, $\phi_{i-1}(\theta_A, \psi_A)$ is the phase corresponding to the shape measurement region in the interference fringe pattern, and $\lambda_{i-1}$ is the wavelength of the light emitted from the light source, where i is an integer greater than 1.

3. The shape measuring method according to Claim 2, wherein a moving distance $v_i$, from the (i-1)th step to the i-th step of the step-scanning step is obtained from the following equation (2):

$$\tan\theta_C = \frac{\overline{OB}\sin\theta_A}{\overline{OB}\cos\theta_A - v_i} \quad (2)$$

where OB is a line segment joining a point B on the surface to be inspected in the i-th step and the center O of curvature of the reference spherical surface, $\theta_A$ is the vertex angle between the line segment OA and a interferometer optical axis, and $\theta_C$, is the vertex angle between a line segment OC joining a point C on the surface to be inspected determined in the (i-1)th step and the center O of curvature of the reference spherical surface and the interferometer optical axis.

4. The shape measuring method according to claim 1, further comprising:
   measuring the positional attitude of the surface to be inspected using a positional attitude measuring device; and
   obtaining the distance between the center of curvature of the reference spherical surface and the point on the surface to be inspected from the positional attitude in at least one step of the step scanning, and setting the reference wavenumber.

5. A shape measuring apparatus, comprising:
   a light source that irradiates a surface to be inspected and a reference spherical surface with light emitted from the light source so as to generate an interference fringe pattern produced by interference between light to be inspected reflected on the surface to be inspected and reference light reflected on the reference spherical surface;
   a wavelength measuring device that measures the wavelength of the light emitted from the light source;
   a lens having a reference spherical surface;
   a position control mechanism configured to hold an object to be inspected having a surface to be inspected and configured to move the object to be inspected relative to the reference spherical surface;
   an imaging unit that receives light reflected from the reference spherical surface and light reflected from the surface to be inspected; and
   a control unit,
   wherein by driving the position control mechanism, the surface to be inspected is step-scanned in multiple steps along an scan axis passing through the center of curvature of the reference spherical surface,
   wherein in each step of the step scanning, the phase corresponding to a shape measurement region in the interference fringe pattern obtained using the imaging unit is measured, and the wavelength of the light is measured using the wavelength measuring device;
   wherein after defining the distance between any point on the surface to be inspected and the center of curvature of the reference spherical surface as a function of wavenumber including the measured phase and wavelength as parameters, the wavenumber in each step is calculated from the relationship of the function between adjacent steps, and the moving distance between each step is calculated; and
   wherein a measurement value of the distance between any point on the surface to be inspected and the center of curvature of the reference spherical surface is calculated from the calculated wavenumber and the function, a design value of the distance between any point on the surface to be inspected and the center of curvature of the reference spherical surface is calculated using the calculated moving distance, and a shape error of the surface to be inspected is calculated from the difference between the measurement value and the design value.

* * * * *